(12) United States Patent
Chacon, Jr. et al.

(10) Patent No.: US 10,134,258 B2
(45) Date of Patent: Nov. 20, 2018

(54) CAR OCCUPANT TEMPERATURE ALERT

(71) Applicants: Daniel V. Chacon, Jr., Murrieta, CA (US); Stefanie Chacon, Murrieta, CA (US)

(72) Inventors: Daniel V. Chacon, Jr., Murrieta, CA (US); Stefanie Chacon, Murrieta, CA (US)

( * ) Notice: Subject to any disclaimer, the term of this patent is extended or adjusted under 35 U.S.C. 154(b) by 0 days.

(21) Appl. No.: 15/338,909

(22) Filed: Oct. 31, 2016

(65) Prior Publication Data
US 2017/0046937 A1 Feb. 16, 2017

Related U.S. Application Data

(60) Provisional application No. 62/280,063, filed on Jan. 18, 2016, provisional application No. 62/367,042, filed on Jul. 26, 2016.

(51) Int. Cl.
| | |
|---|---|
| *G08B 21/22* | (2006.01) |
| *G08B 21/02* | (2006.01) |
| *G08B 21/18* | (2006.01) |
| *B60N 2/00* | (2006.01) |
| *G08B 21/24* | (2006.01) |

(52) U.S. Cl.
CPC ............. *G08B 21/22* (2013.01); *B60N 2/002* (2013.01); *G08B 21/0205* (2013.01); *G08B 21/18* (2013.01); *G08B 21/182* (2013.01); *G08B 21/24* (2013.01)

(58) Field of Classification Search
CPC ...... G08B 21/18; G08B 21/182; G08B 21/22; G08B 21/24; G08B 21/0205
See application file for complete search history.

(56) References Cited

U.S. PATENT DOCUMENTS

| | | | |
|---|---|---|---|
| 6,924,742 B2 | 8/2005 | Mesina | |
| 7,348,880 B2 | 3/2008 | Hules et al. | |
| 8,058,983 B1 | 11/2011 | Davisson | |
| 8,063,788 B1 * | 11/2011 | Morningstar | B60N 2/002 180/271 |
| 9,758,016 B1 * | 9/2017 | Baron | B60H 1/00742 |
| 2002/0161501 A1 * | 10/2002 | Dulin | B62D 7/148 701/41 |
| 2004/0164856 A1 | 8/2004 | Mesina | |
| 2007/0268119 A1 | 11/2007 | Cram et al. | |
| 2011/0267186 A1 | 11/2011 | Rao et al. | |

(Continued)

*Primary Examiner* — Andrew W Bee
(74) *Attorney, Agent, or Firm* — Kirk A. Buhler; Buhler & Associates

(57) ABSTRACT

Improvements in an abandoned baby, infant, child or animal alter system is disclosed. When a child or animal is being transported with a driver in the vehicle, the driver will generally maintain a comfortable temperature in the interior of the vehicle. The temperature and temperature changes are monitored to determine that a child or animal is unattended. The monitor is coupled with a connection in the car, a seat belt of a baby seat or integrated into the baby seat. Integrating the sensor with a seat belt or buckle provides a switch for operation of the sensor. The signaling system can be integrated with the light, horn or alarm or can be connected to a cellular network, Wi-Fi or other radio communications system to send a notification that a baby, infant, child or animal has been left and secured in a vehicle and needs attention.

12 Claims, 4 Drawing Sheets

(56) References Cited

U.S. PATENT DOCUMENTS

| | | | | |
|---|---|---|---|---|
| 2013/0021476 A1* | 1/2013 | Trummer | ............... | B60R 22/48 |
| | | | | 348/148 |
| 2014/0085070 A1* | 3/2014 | Schoenberg | ............ | B60R 22/48 |
| | | | | 340/457.1 |
| 2014/0306838 A1* | 10/2014 | Beumler | .................. | B60N 2/28 |
| | | | | 340/988 |
| 2016/0171859 A1* | 6/2016 | Bowlus | ................. | G08B 21/02 |
| | | | | 340/457 |
| 2016/0200219 A1* | 7/2016 | Tjahjono | ............... | B60N 2/002 |
| | | | | 340/457 |
| 2017/0120813 A1* | 5/2017 | Wilson | .................... | B60Q 9/00 |

* cited by examiner

CAR OCCUPANT TEMPERATURE ALERT

CROSS REFERENCE TO RELATED APPLICATIONS

This application claims the benefit of Provisional Application Ser. No. 62/280,063 filed Jan. 18, 2016 and claims the benefit of Provisional Application Ser. No. 62/367,042 filed Jul. 26, 2016 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the invention

This invention relates to improvements in alerting a person that they have left a child or animal in a vehicle. More particularly, the present alert system monitors temperature and temperature changes to determine that a child has been left in a vehicle and then sends an alert.

Description of Related Art Including Information Disclosed Under 37 CFR 1.97 and 1.98.

Every year a number of babies, children and animals die from being left in a vehicle when the parent or owner leaves the vehicle without removing the baby, child or animal from the vehicle. A higher number of babies, children and animals are left in a car where the baby, child or animal is subject to heat or cold while the baby is left in the vehicle while the owner, parent or guardian leaves. There needs to be a system that notifies a guardian, parent, care giver or other authority that a baby, child or animal has been left in a vehicle.

A number of patents and or publications have been made to address these issues. Exemplary examples of patents and or publication that try to address this/these problem(s) are identified and discussed below.

U.S. Pat. No. 6,924,742 published on Aug. 2, 2005 and U.S. Published application number 2004/0164856, both to Fred Mesina discloses a Baby seat belt alarm system. The seat belt alarm system activates an alarm when a child is buckled in a car seat and when the car key is removed from the ignition. This patent/publication provides a notification immediately upon the child being left in the vehicle but the child may be in a protected garage while a parent moves groceries or bags while a baby or child sleeps.

U.S. Pat. No. 8,058,983 was published on Nov. 15, 2011 for Sally Trimmer Davisson et al., discloses a Baby seat occupant detection system. The baby seat occupant detection system of the present invention functions to reliably remind forgetful or negligent caregivers when they have an infant in a car seat inside a vehicle and have left a predetermined proximity around the vehicle. This is essentially a proximity sensor and does not determent when the infant is neglected or in danger.

U.S. Published application number 2007/0268119 was published on Nov. 22, 2007 to Daryl Cram et al., disclose a Child abandonment avoidance system for automobiles. The child safety system is described which senses when a child is left alone in an automobile and alerting others. This publication also just detects that a child remains alone in an automobile, but does not include parameters that determine if the child in abandoned or remains in the automobile while the parent works around the attended automobile.

What is needed is a baby, infant, child or animal warning system that notifies a person that a child or animal has been left in a vehicle or a period of time that can cause harm. While there is no reason to leave a child or animal unattended in a vehicle, this system sets parameters for when the owner, parent, caregiver or authorities should be notified. The proposed monitoring system in this document provides a solution.

BRIEF SUMMARY OF THE INVENTION

It is an object of the car occupant temperature alert to monitor the temperature and temperature changes in the vehicle. When a child is being transported with a driver in the vehicle, the driver will generally maintain a comfortable temperature in the interior of the vehicle. When the vehicle has reached its destination the driver and occupants leave the vehicle. Without a driver, the temperature in the vehicle changes as the sun or cold ambient conditions effect the inside temperature of the vehicle. The temperature and temperature changes are monitored to determine that a child in a baby seat is unattended. In addition to the change in temperature, high and low temperature thresholds can set-off an alarm condition.

It is an object of the car occupant temperature alert to be coupled with a seat belt of a baby seat or integrated into the baby seat. Integrating the sensor with a seat belt or buckle provides a switch for operation of the sensor. When the child is secured in the seat the buckle is connected, a delay period of several minutes can begin to reduce initial erroneous signals as the car warms or cools. When the child is not secured by a buckle the child can move around the vehicle or exit the vehicle. Integrating the power switch with the buckle saves battery power when the seat is not buckled.

It is another object of the car occupant temperature alert to include a signaling system. The signaling system can be integrated with the light, horn or alarm of the vehicle or can be connected to a cellular network, Wi-Fi or other radio communications system to send a notification that a baby, infant or child has been left and secured in a vehicle and needs attention.

It is another object of the car occupant temperature alert to be embedded in an animal collar that determines if the animal has been left in a vehicle. The warning system uses a proximity sensor in the vehicle to determine if the animal is in the vehicle and then uses an algorithm to determine abrupt temperature changes or extreme temperatures to notify the owner that the animal is in the vehicle.

It is still another object of the car occupant temperature alert to be powered by batteries, connected to a power outlet within the vehicle (such as a cigarette lighter) or to have solar cells that charge a battery. The batteries can be rechargeable or replaceable. A sensor can monitor the charge level of a battery and can send a notification when the power level in the battery is below a safe threshold to signal someone.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
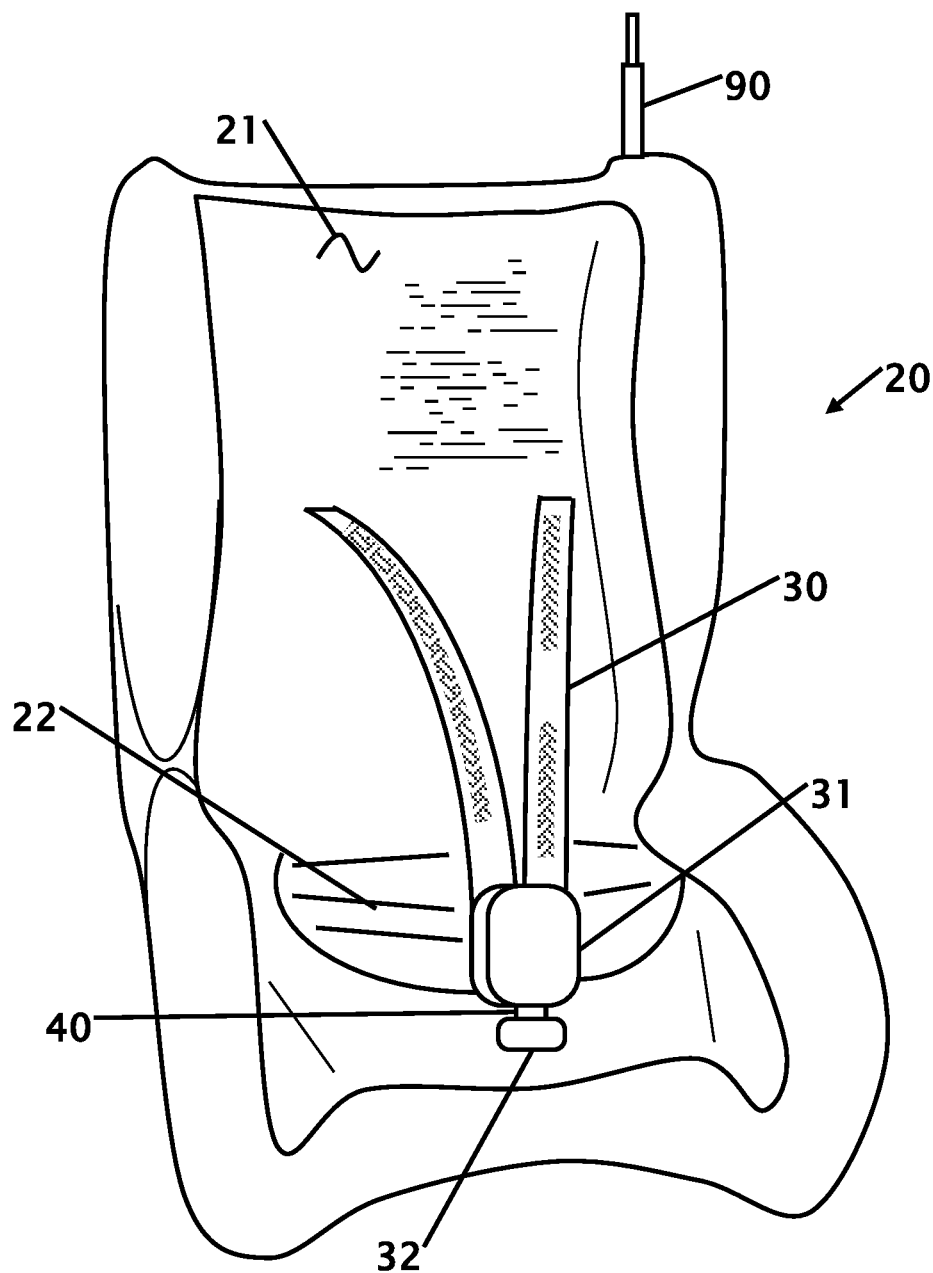
FIG. 1 shows a child car seat temperature alert.

FIG. 1 shows a child car seat temperature alert 20. In this embodiment the sensors are incorporated into the car seat 20. The car seat can be constructed to accept a baby, infant, toddler or child. A weight sensor 22 in the bottom of the car seat is sized based upon the weight of the baby, infant, toddler or child that is placed in the seat. While a weight sensor can be included in the seat 20, the buckle 31 can be used to identify that a child has been secured into the seat 20. A typical baby 30 seat has a plurality of shoulder or chest straps 30 that extend from the back 21 of the seat 20 to one part of the buckle 31. The first part of the buckle 31 is secured into a receiver 40 in the seat 20. A release button 32, released the secured buckle 31. The seat 20 or buckle 31 includes at least one temperature sensor, power supply, signaling system, and optionally a global positioning system (GPS). When the system detects that a child has been left within the seat 20 an antenna 90 transmits a signal to alert parents, a care giver or authorities.

In another contemplated embodiment, the sensors are placed in an intermediary buckle device that is essentially a male and female buckle extension that goes between the buckle 31 and the receiver 40. This embodiment is shown and described in more detail in other figures of this document.

Figure 2:
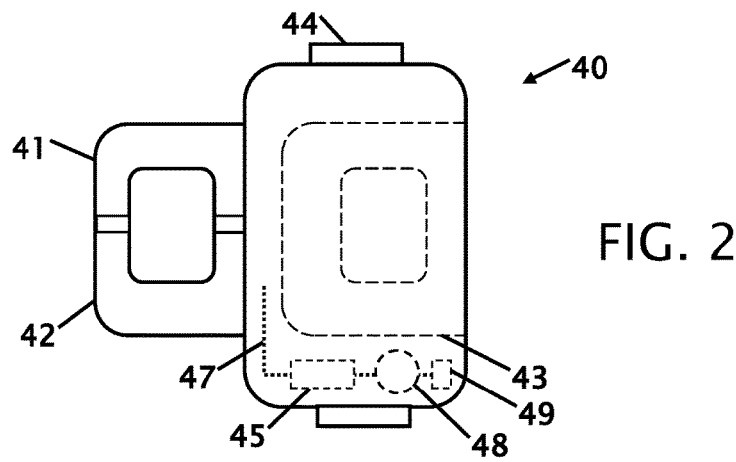
FIG. 2 shows an interconnecting module for use on an existing child seat.

FIG. 2 shows an interconnecting module 40 for use on an existing child seat. This device allows a parent or care giver to utilize the child alert system without requiring replacement of the entire seat. This device can also be transferred from one seat to another. The interconnecting module 40 has a female buckle receiver 43 and a male buckle. Because the interconnecting module 40 is not integrated into the baby seat, a weight sensor is not available to determine if a child is in the seat. The male portion of the buckle is constructed in two parts, or with two contacts 41 and 42 with an insulator between the two contacts. It is also contemplated that a magnetic or proximity sensor can be used to determine if the buckle is secured inside of a baby seat. To release the male portion from a seat, the existing buckle release mechanism is operated (32 from a previous figure). The male buckle from the seat is released with one or more buttons 44.

Within the interconnecting module 40 is a microcontroller 45 or other processing module 45. This processor is connected to a power supply 48 or battery and sensor(s) 49, and an antenna 47 or similar communications device. The sensor(s) include a minimum of a temperature sensor, but could include a GSP module, proximity sensor, thermal sensor or weight sensor. It is also contemplated that the interconnecting module 40 could include a light emitting diode LED or a speaker to provide information regarding the status of the battery or confirmation that the interconnecting module 40 is operating. The temperature sensor 49 monitors the ambient temperature at or around the interconnecting module 40. Two sensors can be placed on opposite sides of the interconnecting module 40 to monitor the temperature facing the child and facing away from the child to obtain a differential or to reduce radiated human temperature confusion in readings.

When a child is first placed into the seat and buckled into the seat, the interconnecting module 40 will generally register the temperature of the inside of the car. Over time the temperature will change as the child is being transported. The graph shows two scenarios with both an initially hot vehicle and an initially cold vehicle to provide signaling from either extreme.

Figure 3:
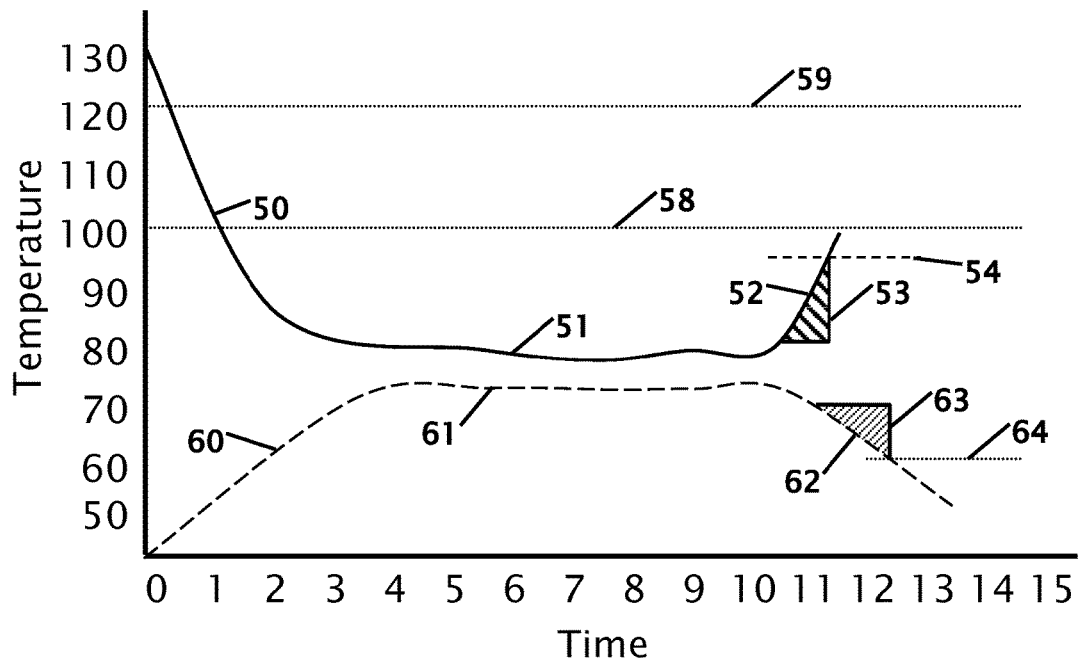
FIG. 3 shows temperature changes over time and for determining when to send an alert.

FIG. 3 shows temperature changes over time and for determining when to send an alert. Starting with the upper plot that shows an initially hot vehicle, this vehicle is in a sunny summer environment where the initial inside temperature of the vehicle is shown at 130 degrees. When the child is buckled into the vehicle, the vehicle is started, the driver will operate the air conditioning or vents to cool the interior of the vehicle. When the buckle is connected, the time starts at 0 minutes. Connecting the buckle powers or starts the monitoring. The temperature drops 50 as the interior of the vehicle is brought to a comfort level and the comfort level is maintained 51 as the car is being driven. At some point the driver will reach their destination and turn the car off. If the buckle is opened, then the monitoring will stop.

In the upper graph, the child is left buckled in the vehicle with the windows closed. The temperature inside the vehicle increases from heat of the sun 52 until the increase in temperature exceeds a threshold 54. In the preferred embodiment, the temperature rise rate 53 that indicates the child has been left in the vehicle is 10, 12 or 15 degrees of rise in a three-minute period of time. The threshold may be fixed or adjustable as dictated by testing. A first threshold of 100 degrees and/or 120 degrees may also trigger a signal regardless of the temperature rise rate.

In the lower plot, the child is placed in a cold vehicle. Connecting the buckle powers or starts the monitoring. The temperature rises 60 as the interior of the vehicle is brought to a comfort level and the comfort level is maintained 61 as the car is being driven. At some point the driver will reach their destination and turn the car off. If the buckle is opened, then the monitoring will stop. The child is left buckled in the vehicle with the windows closed. The temperature inside the vehicle decreases from the cold exterior of the vehicle 62 until the decrease in temperature exceeds a threshold 64. In the preferred embodiment, the temperature drop 63 rate that indicates the child has been left in the vehicle is 10, 12 or 15 degrees of drop in a three minute period of time. The threshold may be fixed or adjustable as dictated by testing. There can also be lower thresholds that trigger a signal regardless of the temperature drop rate.

Figure 4:
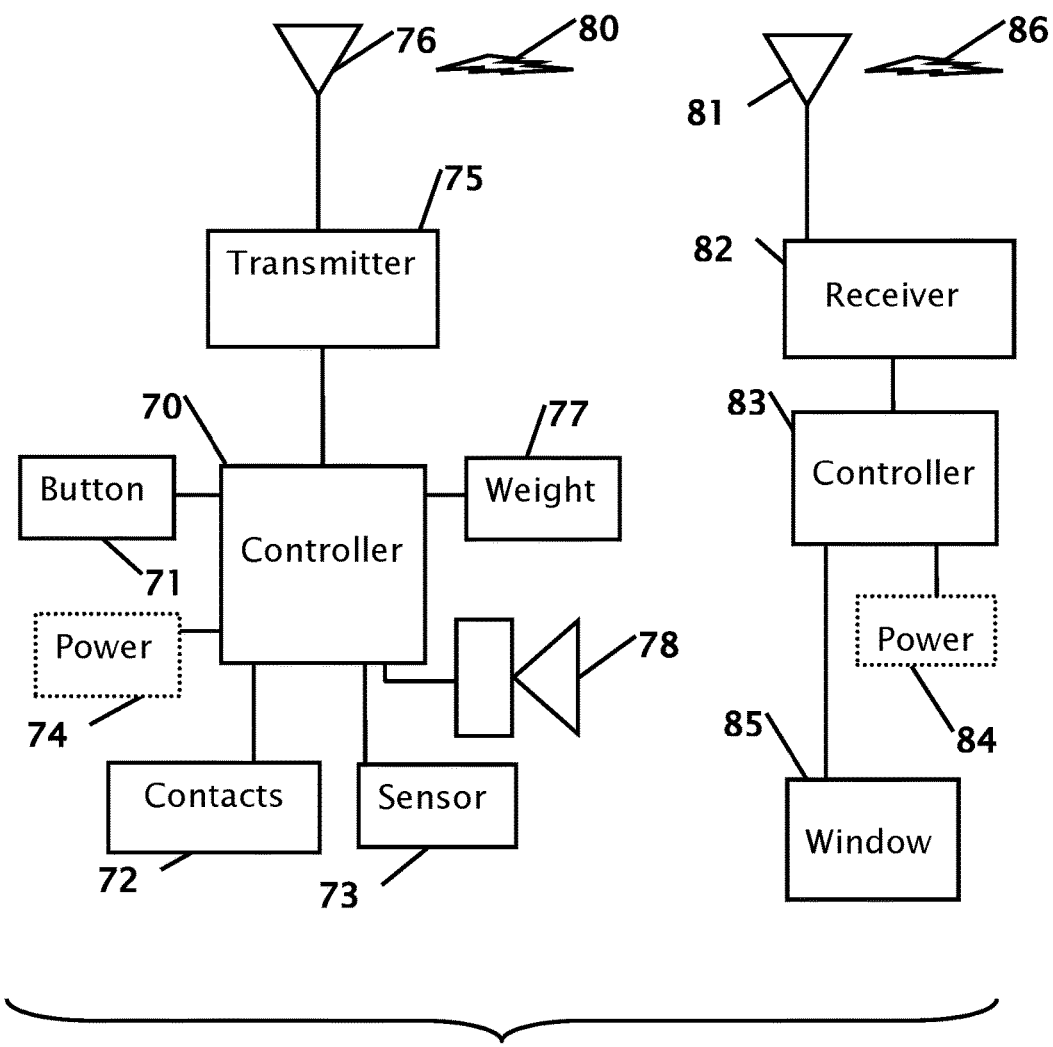
FIG. 4 shows a block diagram of the components in the child car seat temperature alert.

FIG. 4 shows a block diagram of the components in the child car seat temperature alert. The left portion of this figure is for the sensor module regardless of the module being installed in a seat or a buckle device. The right portion of the figure is for a receiver module. Both of these modules can be combined as a single unit, but separating them provides for lower power consumption of a battery powered unit (left) that transmits 80 a low-power short-range single through Bluetooth or other low-power wireless transmission to a higher power transmitter 86 (right) that can be powered by a cigarette light in a vehicle.

The temperature monitor has a controller 70 that is powered by a rechargeable or replaceable battery 74. It is also contemplated that the power can come from connection with a vehicle, but this adds a requirement for wiring and connection that is less convenient. The controller 70 is shown connected to sensor 73, such as a temperature sensor and optionally a GPS sensor that can determine the geographical location of where the child is located the enable authorities to rescue a child. This diagram shows a weight sensor 77 and a speaker 78 that can provide sounds or speech to indicate sensing, un-bucked condition or low battery. An LED can also be included. One or more buttons 71 can be incorporated. This figure shows contacts 72 or a switch or a load cell to indicate that a child is present and the buckle is secured. A transmitter 75 is connected to the controller 70 and the transmitter has an antenna 76 for transmission of a warning condition at higher power for help.

The separate antenna 81 can be connected to a separate controller 83 that can send 86 a warning to a person's cell phone, cellular device or to authorities. The controller can also be connected to the horn and lights and/or windows 85 of the vehicle to open or crack the windows to provide some relief before a person arrives to provide assistance. There can be a connection or integration into the internal control electrical bus structure of the vehicle.

Figure 5:
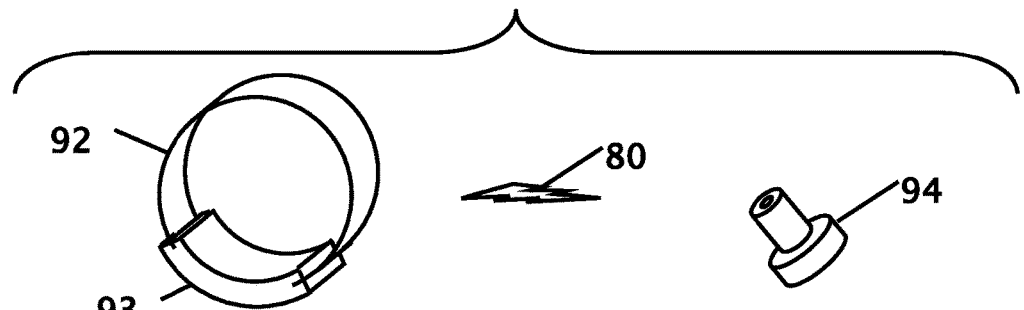
FIG. 5 shows a pictorial diagram of an animal collar with a receiver.

FIG. 5 shows a pictorial diagram of an animal collar 92 with a receiver 94. The collar 92 has an integrated sensor, power supply and transmitter/receiver module 93. The collar unit is in communication 80 with the receiver/signaling unit 94. To maintain the temperature sensor in a location that is unlikely to receive high temperature and/or abrupt temperature changes the location of the temperature sensor is arranged on a weighted collar to place the sensor off of the top or bottom hanging location of the collar to keep the sensor out of the sun and to reduce the potential for the sensor sitting directly under the chin where the sensor does not receive ambient temperature.

Figure 6:
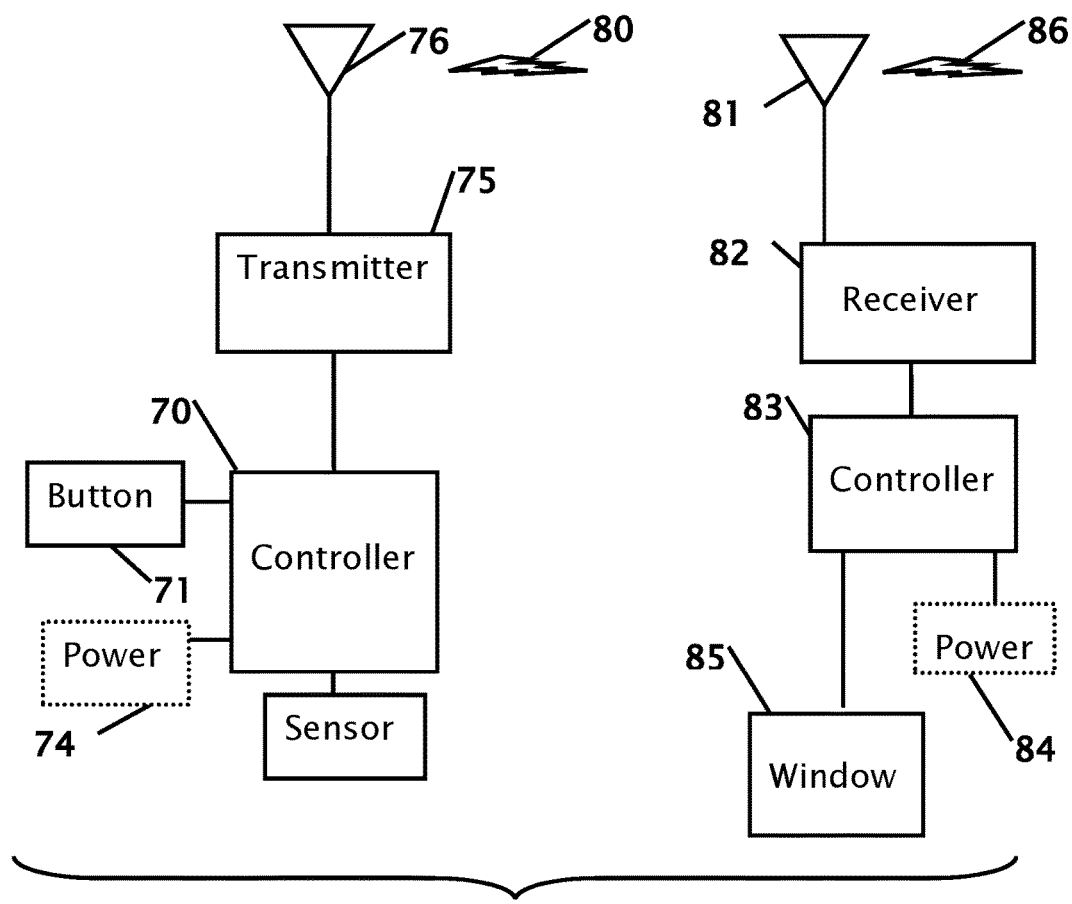
FIG. 6 shows a block diagram of the components in the animal collar temperature alert.

FIG. 6 shows a block diagram of the components in the animal collar temperature alert. Because a dog or other animal does not generally sit on a seat or a particular location in a vehicle, determining if an animal is in the vehicle is determined by a proximity sensor. The proximity sensor is with a short-range transmitter and receiver, like a Bluetooth device that has a range of about 10 meters. A Bluetooth device further requires limited power and can intermittently send a signal for proximity and for the temperature. The sensor is integrated with the collar.

In operation, when the animal collar is within blue tooth proximity of the receiver 94 in the vehicle and the vehicle is off, the temperature of the collar 92 is monitored by the receiver. The monitoring is consistent with the monitoring disclosed previously herein this disclosure.

Thus, specific embodiments of an occupant car temperature alert have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A child car temperature alert comprising:
an occupant detection circuit;
a temperature sensor unit;
a signal transmission unit;
a processor unit connected to said occupant detection circuit and said temperature sensor unit;
said processor unit monitors said temperature sensor unit when an occupant is detected;
said occupant detection circuit, said temperature sensor unit, said signal transmission unit and said processor unit is integrated within a seat buckle;
said occupant detector circuit is a belt closed sensor consisting of a sensor that closes a circuit when a single male portion having two separate contacts separated by and insulator is inserted into said seat buckle, and
based upon a temperature change of at least 10 degrees centigrade over a three-minute period of time said processor unit transmits an alarm indicator.

2. The child car temperature alert according to claim 1, wherein said alarm indicator is an audible alarm and/or lights.

3. The child car temperature alert according to claim 1, wherein said alarm indicator is a wireless signal to a cellular device.

4. The child car temperature alert according to claim 1, wherein an alarm output device is wired to a vehicle.

5. The child car temperature alert according to claim 1, wherein said occupant detection circuit is also a load cell.

6. The child car temperature alert according to claim 1, further includes a temperature threshold limit alarm wherein said temperature limit threshold is a high temperature or a low temperature.

7. An animal car temperature alert comprising:
an animal detection circuit;
a temperature sensor unit;
a signal transmission unit;
a processor unit connected to said animal detection circuit and said temperature sensor unit;
said processor unit monitors said temperature sensor unit when an animal is detected;
said animal detection circuit, said temperature sensor unit, said signal transmission unit and said processor unit is integrated with a buckle or collar;
said animal detection circuit is a belt closed sensor consisting of a male portion with two contacts separated by and insulator, and
based upon a temperature change of at least 10 degrees centigrade over a three-minute period of time said processor unit transmits an alarm indicator.

8. The animal temperature alert according to claim 7, wherein said alarm indicator is an audible alarm and/or lights.

9. The animal temperature alert according to claim 7, wherein said alarm indicator is a wireless signal to a cellular device.

10. The animal temperature alert according to claim 7 wherein an alarm output device is wired to a vehicle.

11. The animal temperature alert according to claim 7, wherein said animal detection circuit is also a load cell.

12. The animal temperature alert according to claim 7, further includes a temperature threshold limit alarm wherein said temperature limit threshold is a high temperature or a low temperature.

\* \* \* \* \*